C. H. BUCKELEW.
Lamp Cone.

No. 47,087.

Patented April 4, 1865.

Witnesses
Henry Combs
Geo. B. Reed

Inventor:
Chas H Buckelew
per Munn & Co
Attorneys

UNITED STATES PATENT OFFICE.

CHARLES H. BUCKELEW, OF JERSEY CITY, NEW JERSEY.

IMPROVED LAMP-CONE.

Specification forming part of Letters Patent No. 47,087, dated April 4, 1865.

*To all whom it may concern:*

Be it known that I, CHARLES H. BUCKELEW, of Jersey City, in the county of Hudson and State of New Jersey, have invented a new and Improved Lamp-Cone; and I do hereby declare that the following is a full, clear, and exact description thereof, which will enable any person skilled in the art to make and use the same, reference being had to the accompanying drawings, making a part of this specification, in which—

Figure 1:
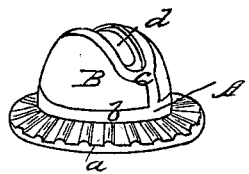
Figure 2:
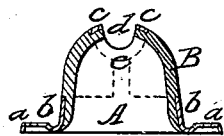
Figure 3:
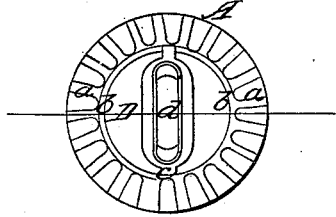

Figure 1 is a perspective view of my invention; Fig. 2, a side sectional elevation of the same; Fig. 3, a plan view of the same.

Similar letters of reference indicate like parts.

This improvement relates to the construction of the air-cone or flame-deflector which surrounds or covers the upper part of the ordinary kerosene or petroleum oil lamps.

A is the cone frame, consisting of a circular base plate, $a$, made of metal, fluted horizontally to form air-passages in the common manner with an inner edge, $b$, rising a short distance vertically, as shown, said edge being surrounded by a narrow bifurcated connecting-bar, $c$, which extends over from one side of the edge $b$ to the other, as shown. The flame-orifice $d$ is arranged between the bifurcations of the bar $c$, as indicated.

The body or filling of the above-described frame A is composed of glass, which is applied in the following manner: After the frame A has been finished and constructed as hereinbefore described, it is placed within a glass mold suitably made for the purpose, and the interior of the said frame A is then filled with glass by blowing, pressing, or casting the glass into or upon the said frame A in substantially the same manner that glass is blown, pressed, or cast upon other objects placed in the mold, and which all glass-blowers understand, rendering further description thereof unnecessary. After the glass has been applied a flame-opening is cut through the glass between the bifurcations of the cone by means of a grinding-stone or other cutter. The filling of glass, when thus blown, cast, or pressed upon the frame A, becomes thereby so firmly attached to said frame that the glass cannot readily break; but if, by any accident, or by the contraction or expansion due to the heat of the lamp-flame, the glass should become cracked, the pieces will still be so firmly held together within the frame that they can rarely separate, and the glass, even if cracked, will still continue to serve its useful function as a filling.

When the glass is thus blown, cast, or pressed upon the frame A, the latter becomes embedded in the glass, as shown, in a very firm manner, rendering the separation of the glass very difficult.

By the use of a glass filling, D, in the manner described I obtain nearly all the advantages of a cone composed entirely of glass, without the disadvantage of constant breakage and loss which attend the use of the latter.

I do not limit myself to any particular form of frame or flame-cone.

I do not claim, broadly, the making of cones of glass as a filling; but,

Having thus described my invention, I claim as new and desire to secure by Letters Patent—

The construction of the cone-frame with a metallic base and bifurcated connecting arch with a filling or dome of glass blown or cast within the said frame, substantially as herein described and represented.

CHAS. H. BUCKELEW.

Witnesses:
JAMES P. HALL,
C. L. TOPLIFF.